United States Patent
Marchi (10) Patent No.: US 12,223,465 B2
(45) Date of Patent: Feb. 11, 2025

(54) AUTOMATED PLANT FOR CUTTING AND OPERATING FLAT SLABS AND RELATIVE PROCEDURE

(71) Applicant: GRANITIFIANDRE S.P.A., Castellarano (IT)

(72) Inventor: Domenico Marchi, Baiso (IT)

(73) Assignee: GRANITIFIANDRE S.P.A., Castellarano (IT)

( * ) Notice: Subject to any disclaimer, the term of this patent is extended or adjusted under 35 U.S.C. 154(b) by 1364 days.

(21) Appl. No.: 16/151,507

(22) Filed: Oct. 4, 2018

(65) Prior Publication Data
US 2019/0099918 A1 Apr. 4, 2019

(30) Foreign Application Priority Data
Oct. 4, 2017 (IT) .......................... 102017000111171

(51) Int. Cl.
*G06Q 10/087* (2023.01)
*B65G 1/137* (2006.01)

(52) U.S. Cl.
CPC ......... *G06Q 10/087* (2013.01); *B65G 1/1378* (2013.01)

(58) Field of Classification Search
CPC . G05B 2219/31; G05B 19/418; G06Q 10/087
See application file for complete search history.

(56) References Cited

U.S. PATENT DOCUMENTS

| 4,458,470 | A | * | 7/1984 | Fine ........................ | B65B 11/54 |
| | | | | | 53/502 |
| 4,827,423 | A | * | 5/1989 | Beasley ............. | G01N 29/2493 |
| | | | | | 700/100 |
| 5,374,231 | A | | 12/1994 | Obrist | |

(Continued)

FOREIGN PATENT DOCUMENTS

| EP | 2345941 A1 | 7/2011 |
| ES | 2302604 A1 | 7/2008 |

*Primary Examiner* — Florian M Zeender
*Assistant Examiner* — Vanessa Deligi
(74) *Attorney, Agent, or Firm* — Dickinson Wright PLLC; Andrew D. Dorisio (57) ABSTRACT

An automated plant (10) for cutting and operating flat slabs made from ceramic or the like for typically but not exclusively manufacturing slabs intended for use as coating elements at both civil and industrial levels and for both indoor and outdoor environments, comprising a first macro-area (12) defining an area suitable for storing products consisting of semi-finished slabs or mother-slabs, a second macro-area (14) defining an area for storing auxiliary packing materials or consumable materials for operations or processes on said slabs, a third macro-area (16) defining a production area for processing, packaging, and packing daughter-slabs or sub-formats of slabs obtained from mother-slabs, a fourth macro-area (18) defining a finished product area or store for letting the products coming from the third macro-area (16) pass through/temporarily accumulate, said plant also comprising automatic handling means for slaving and handling materials and semi-finished and (Continued)

finished products between said macro-areas and internally thereto, and a central control unit for programming, managing, and controlling the operation of said macro-areas and the interaction therebetween.

7 Claims, 5 Drawing Sheets

(56) References Cited

U.S. PATENT DOCUMENTS

| | | | |
|---|---|---|---|
| 9,623,562 B1* | 4/2017 | Watts | B25J 13/006 |
| 10,192,195 B1* | 1/2019 | Brazeau | B25J 9/1661 |
| 2004/0064385 A1* | 4/2004 | Tamaki | G06Q 10/06 |
| | | | 705/29 |
| 2007/0187873 A1* | 8/2007 | Bailey | B28B 11/001 |
| | | | 264/333 |
| 2007/0282718 A1* | 12/2007 | Morgan | B23D 59/008 |
| | | | 705/28 |
| 2008/0052198 A1* | 2/2008 | Hosokawa | G06Q 30/06 |
| | | | 705/28 |
| 2012/0020767 A1 | 1/2012 | Schafer | |
| 2013/0186044 A1 | 7/2013 | Cremer | |
| 2017/0225891 A1* | 8/2017 | Elazary | G05D 1/0234 |
| 2019/0177226 A1* | 6/2019 | Lee | C04B 14/04 |

* cited by examiner

AUTOMATED PLANT FOR CUTTING AND OPERATING FLAT SLABS AND RELATIVE PROCEDURE

TECHNICAL FIELD

The present invention relates to an automated plant for cutting and operating flat slabs and to a procedure for cutting the mentioned slabs by way of said plant.

BACKGROUND

More specifically, the present invention relates to a plant the function of which is to fully automatically cut flat slabs made from ceramic or the like as used to typically but not exclusively manufacture tiles intended for use as coating elements both at the civil level and at the industrial level and for both indoor and outdoor environments.

As known, tiles are obtained by cutting flat slabs which are in turn obtained from a mixture of clay materials, quartz sand and other materials, which is subsequently baked in a furnace at variable temperatures as a function of the types of materials present in the mixture and/or of the effect or structural characteristics to be achieved.

More specifically, the slabs obtained from cutting slabs that are in turn obtained from baking a mixture in a furnace are subsequently split into sub-slabs, from which the mentioned tiles having different shapes and dimensions as a function of the specific requirements are obtained; for explanatory purposes only, the original slabs can have length/width dimensions equal to 3000×1500 mm, 1600×1600 mm, 1000×1000 mm, 1500×1500 mm, or the like.

As previously indicated, the slab sub-formats are subsequently cut into portions or smaller formats and put in containers, boxes, or crates, or laid on tile stands as a function of dimensions and subsequently sent to a store for being subsequently shipped according to the customer/final user requests.

Typically the original slabs stored in a raw or semi-finished product store are split as a function of the type of material, color, surface finishing, and so on, are picked up from said store and transferred to an apparatus wherein they undergo cutting operations in order to obtain sub-formats, a brushing operation and/or other processings, if any, and checked and arranged in boxes/containers or on tile stands which, once formed, are subsequently transferred to a finished product store and stored therein for a subsequent shipping as a function of the customer/final user orders.

The handling operations between the raw/semi-finished products store, the processing apparatus, and the finished product store can be performed manually, automatically, or semi-automatically.

Some manufacturing solutions comprise finished product stores of a fully automated type wherein the slabs cut into sub-formats are organized into pallets (also referred to as order-pallets) according to the dimensions, material, and colors/decorations, said pallets being in turn organized into big pallets (also referred to as mother-pallets) which collect said smaller pallets or order-pallets as a function of the material of the slabs and/or surface color/decoration.

The mother-pallet is automatically picked-up from its seat in the store, as a function of the final user order, and transferred to a zone from which the order-pallet corresponding to the order code is picked-up and subsequently moved to a loading/shipping zone, whereas the mother-pallet is re-positioned in its own seat inside the store, which will be periodically replenished and supplemented with the order-pallets so as to always hold a minimum product lot (or order-pallet) to a constant value in the mother-pallets.

However, such known solutions for processing and operating slabs feature a number of major drawbacks, substantially bound to the sequences of production steps which tend to increment the operation costs.

Specifically, a drawback of the traditional solutions consists in that they comprise a product store wherein the stock level shall permanently be held to an optimum value in order to be able to satisfy all order requests without undergoing stops or slowdowns in the production cycles, which might lead to increased operation costs and final product costs.

A further drawback is in that, account being taken of the fact that products are typically organized into pallets as a function of the dimensions and colors/decorations and material, and that each individual pallet will always be defined by given number of individual pieces, it will not be possible to arrange products with equal dimensions but different colors/decorations or materials inside one and the same order-pallet.

Such drawback entails, as a consequence, further drawbacks bound to the store operation costs, by virtue of the fact that more pallets with slabs of different dimensions shall be stored against one and the same color or material and, likewise, more order-pallets containing slabs of the same color or slabs of the same dimensions or surface finishing or the like shall be stored for slabs of the same material. An object of the present invention is to obviate the drawbacks listed above.

SUMMARY

More specifically, an object of the present invention is to provide a fully automated plant for processing and operating flat slabs suitable for allowing for an optimization of the manufacturing steps and a consequent cost optimization.

A further object of the present invention is to provide a plant suitable for allowing an organization whereby the products are organized into groups in containers/boxes or arranged on tile stands, said groups comprising products that might even have different colors/decorations or surface finishings or materials.

A further object of the present invention is to provide a plant for processing flat slabs and a procedure or sequence of operating steps for said plant wherein the stores are not organized on a "per stock" basis, but as a function of the orders, with the purpose of cutting the costs associated with the finished product stores, where the finished products are stored for being delivered/manufactured (in fact, a material management of the type commonly referred to as "just in time").

A further object of the present invention is to put at users' disposal an automated plant for cutting flat slabs and a procedure for cutting the same by way of said plant, suitable for guaranteeing a high reliability over time and also such as to be implemented in an easy and cost-effective manner.

These objects and others are achieved by the invention that presents the characteristics according to claim 1.

In accordance with the invention, an automated plant for cutting and operating flat slabs made from ceramic or the like is provided, for typically but not exclusively manufacturing tiles intended for use as coating elements both at the civil level and at the industrial level and for both indoor and outdoor environments, which comprises a first macro-area defining an area suitable for storing the products defined by semi-finished slabs or mother-slabs, a second macro-area defining an area for storing auxiliary packing materials or consumable materials for processing said slabs, a third macro-area defining a production area for processing, packaging, and packing daughter-slabs or sub-formats of slabs derived from the mother-slabs, a fourth macro-area defining a finished product area or store for the transit/temporary accumulation (buffering) of the products coming from the third macro-area, said plant also comprising automatic handling means for slaving and moving materials and semi-finished and finished products between said macro-areas and internally thereof, and a central control unit for programming, managing, and controlling the operation of said macro-areas and the interaction therebetween.

Advantageous embodiments of the invention are apparent from the dependent claims.

BRIEF DESCRIPTION OF THE DRAWING FIGURES

The constructional and functional characteristics of the automated plant for cutting and operating flat slabs and of the procedure in accordance with such plant can be better understood from the following detailed description, wherein reference will be made to the attached drawings which represent a non-defined embodiment thereof provided for explanatory, non-limitative purposes only, and wherein.

DETAILED DESCRIPTION OF THE INVENTION

Figure 1:
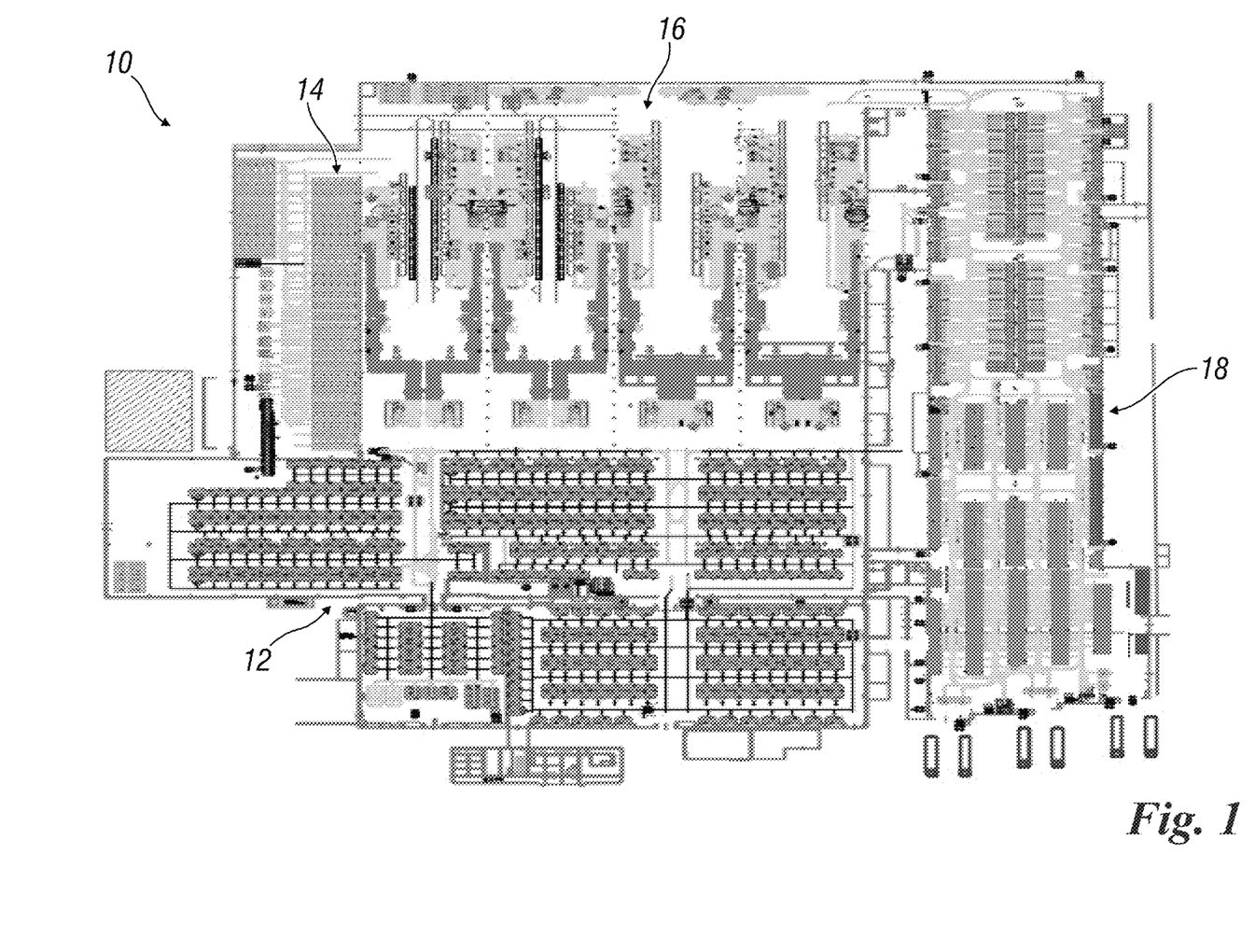
FIG. 1 schematically shows a top view of a lay-out of an automated plant for cutting and operating flat slabs according to the present invention.

With reference to the mentioned figures, the automated plant for cutting and operating flat slabs according to the present invention, identified by the reference numeral 10 as a whole in the figures, comprises a plurality of macro-areas or working areas comprising, with reference to the preferred embodiment according to the figures, a first macro-area 12 defining an area suitable for storing the semi-finished products (the slabs), a second macro-area 14 which defines an area for storing auxiliary materials (such as, for instance, packing materials, consumable materials for cutting operations and the like), a third macro-area 16 defining a production area for the processing (cutting, control, etc.), packaging, and packing of the sub-slabs derived from the original slabs, and finally a fourth macro-area 18 defining a finished product area or store for the transit/accumulation (buffering) of the products coming from the third macro-area 16.

The materials and products are moved between the mentioned macro-areas and internally thereto by way of automatic moving devices and, more specifically, by way of laser guide vehicles (LGVs) or other type of known guides, said handling devices being controlled by a central control unit whose characteristics will be better discussed below.

Figure 2:
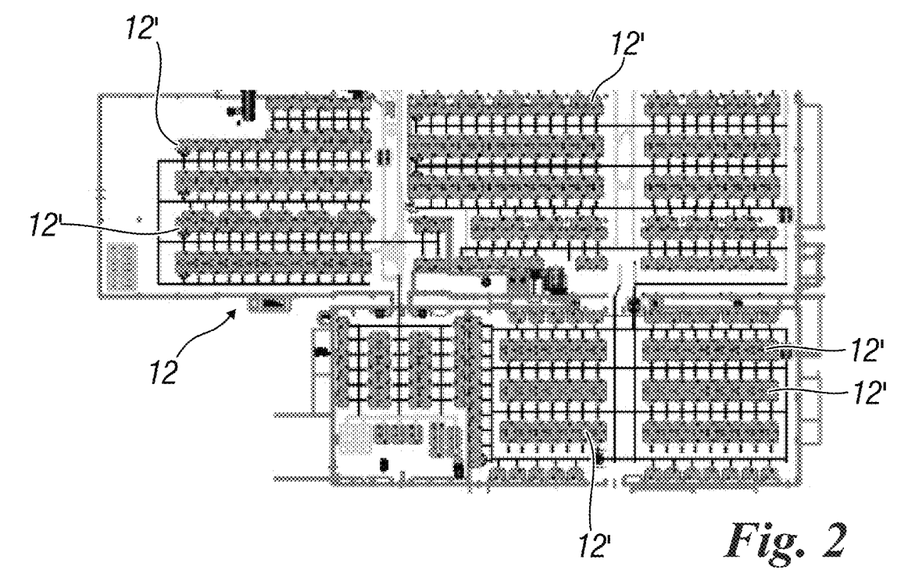
FIG. 2 schematically shows a top view of a first section of the plant according to the invention.

The first macro-area 12, schematically shown in details in FIG. 2, comprises an automated/robotized store, wherein original or semi-finished slabs coming from ceramic furnaces are stored, the mother-slabs having a natural or polished surface finishing (in this case, before being stored in the store, they are submitted to a polishing operation in a marble processing facility or a similar structure).

Said store comprises a plurality of shelves 12' comprising encoded storage positions (store position code) suitable for receiving mother-slabs provided with a code (product code) bound to the store position code.

The mother-slabs coming from the furnaces and/or from an external smoothing/polishing operation, if any, are characterized in having an identification code different from that which characterizes raw slabs, said codes (product codes) containing information on the dimensional characteristics of the mother-slabs, their material, color, and surface finishing.

This identification code of the mother-slabs is associated with a position-code identifying the position in the automated store in the first macro-area 12.

The mother-slabs are stored and picked-up from the storage positions in the shelves 12' by using automatic handling devices (not shown) which are movable through said shelves; the mother-slabs are picked-up and positioned (in the case of store feeding) from and on the shelves of the store by means of an automatic handling device which reads the position-code.

In a preferred embodiment, the automatic store in the first macro-area 12 comprises, in every storage position, a pallet which contains a number of mother-slabs tendentially equal to forty-five mother-slabs having, purely as an indication, a thickness of 6 mm; however, it is to be understood that the number of slabs in a pallet can vary as a function of the thickness of the slabs comprised therein. The storage of the mother-slabs in the shelves of the automatic store in the first macro-area 12 is controlled, as better detailed below, by a central control unit in order to optimize the paths of the automatic handling devices on the basis of the time priorities of the work orders. More specifically, the store is optimized by storing the products (the mother-slabs) featuring a greater turn-over in those shelves which are located closer to the processing units in the third macro-area, as discussed below.

Figure 3:
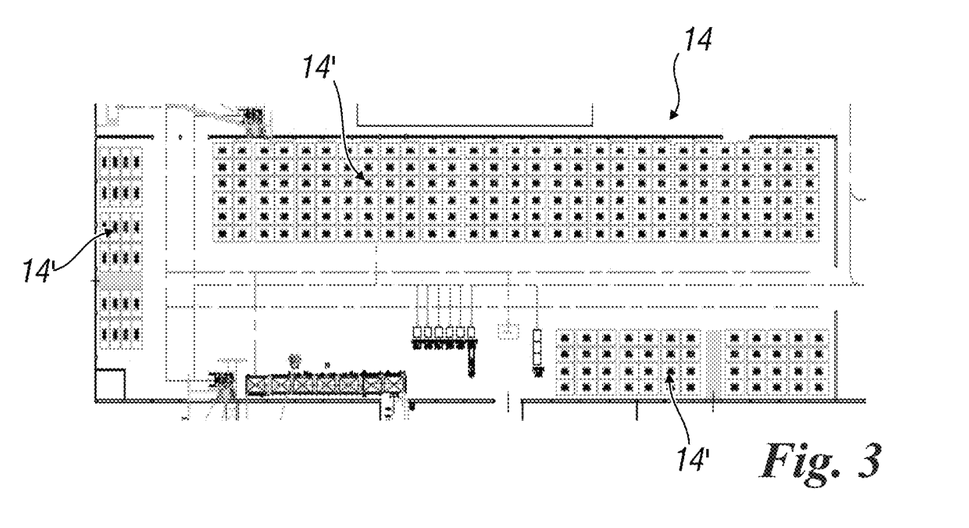
FIG. 3 schematically shows a top view of a second section of the plant according to the invention.

The second macro-area 14, schematically shown in detail in FIG. 3, comprises a further store 14' wherein there are stored the means for packing the sub-slabs (or daughter-slabs) obtained from cutting/processing said mother-slabs and consisting of crates, boxes, or racks (or even stands and layer pads); for this purpose, said further store will comprise different zones for storing different packing means, said zones being provided with different identification codes associated with the identification codes of the sub-slabs or daughter-slabs.

The same further store 14' comprises storage zones for storing consumable materials such as, for instance, sand for mother-slab cutting operations or otherwise known materials.

In this case too, the automatic handling devices are movable internally to said further store 14', the paths of said handling devices being controlled and optimized by the central unit on the basis of the order processed by the same.

The control of said further store 14' in the second macro-area 14 is optimized on the basis of the paths the automatic handling devices shall follow on the basis of the production schedules.

Such further store is provisioned manually by an operator who positions the product, provided with an identification code, on a roller conveyor located outside the further store, which is picked-up by the automatic handling device which receives a control from the central unit upon reading the product identification code or dimensionally reading the product or the position internally to the store 14; said product is then picked-up from the roller conveyor by the automatic handling device and positioned in the further store in an encoded position which is associated with the product identification code located therein.

Figure 4:
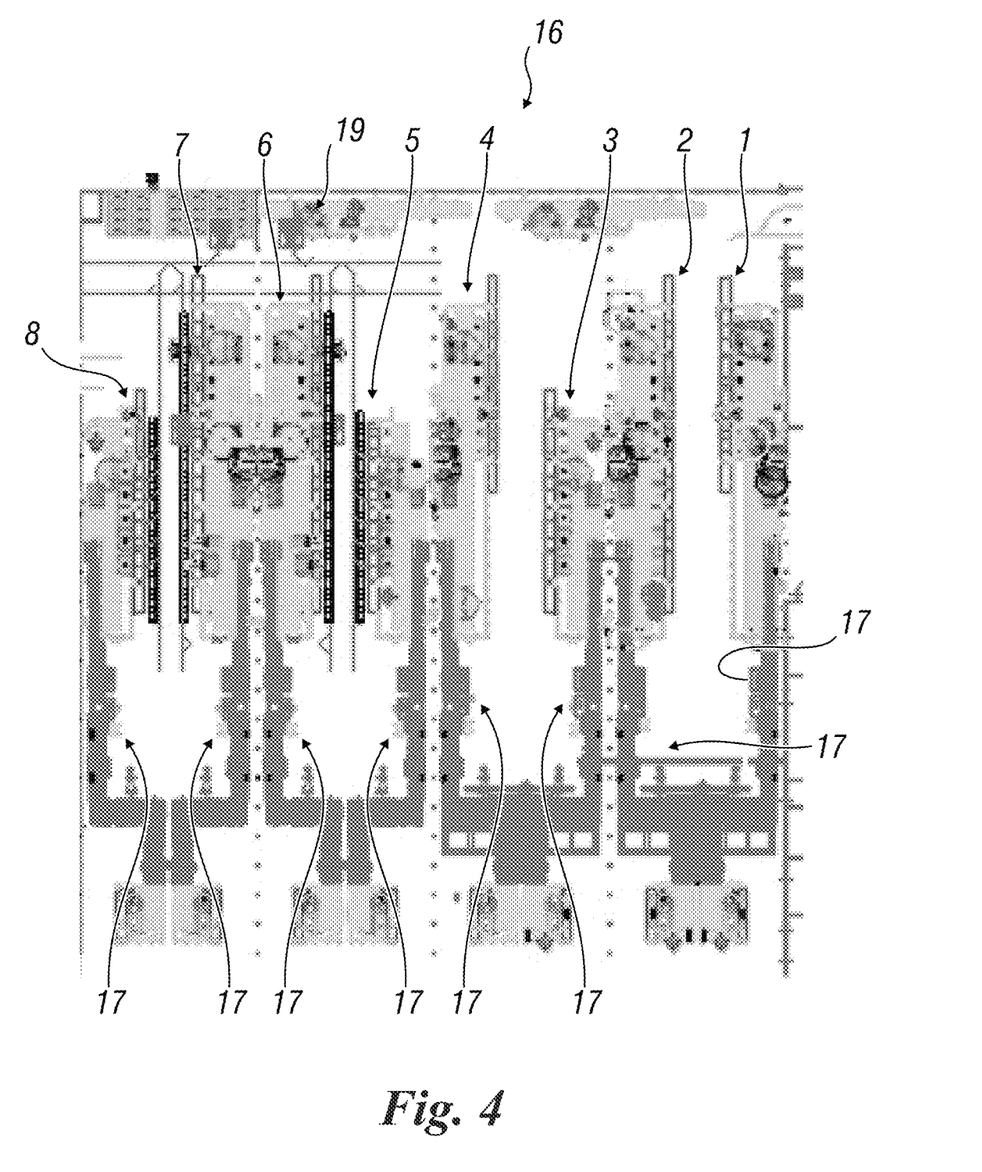
FIG. 4 schematically shows a top view of a third section of the plant according to the invention.

The third macro-area 16, schematically shown in details in FIG. 4, defines a production area wherein the mother-slabs coming from the first macro-area 12 are processed to obtain sub-slabs or daughter-slabs.

Said third macro-area 16 comprises at least one production line 17 wherein the mother-slabs are cut, cleaned, checked, and unloaded into crates or arranged on stands as better described below.

The daughter-slabs featuring smaller format are arranged on trays and said trays are subsequently put into crates; on the contrary, the daughter-slabs having bigger format (for instance "300(mm)×150(mm)" or "150(mm)×150(mm)" slabs) can be arranged in crates or on stands depending on the customer requirements (this operation is also performed automatically, the central unit controlling the arrangement of the slabs into crates or on stands depending on the parameters entered in the work order (as discussed in details below).

Figure 5:
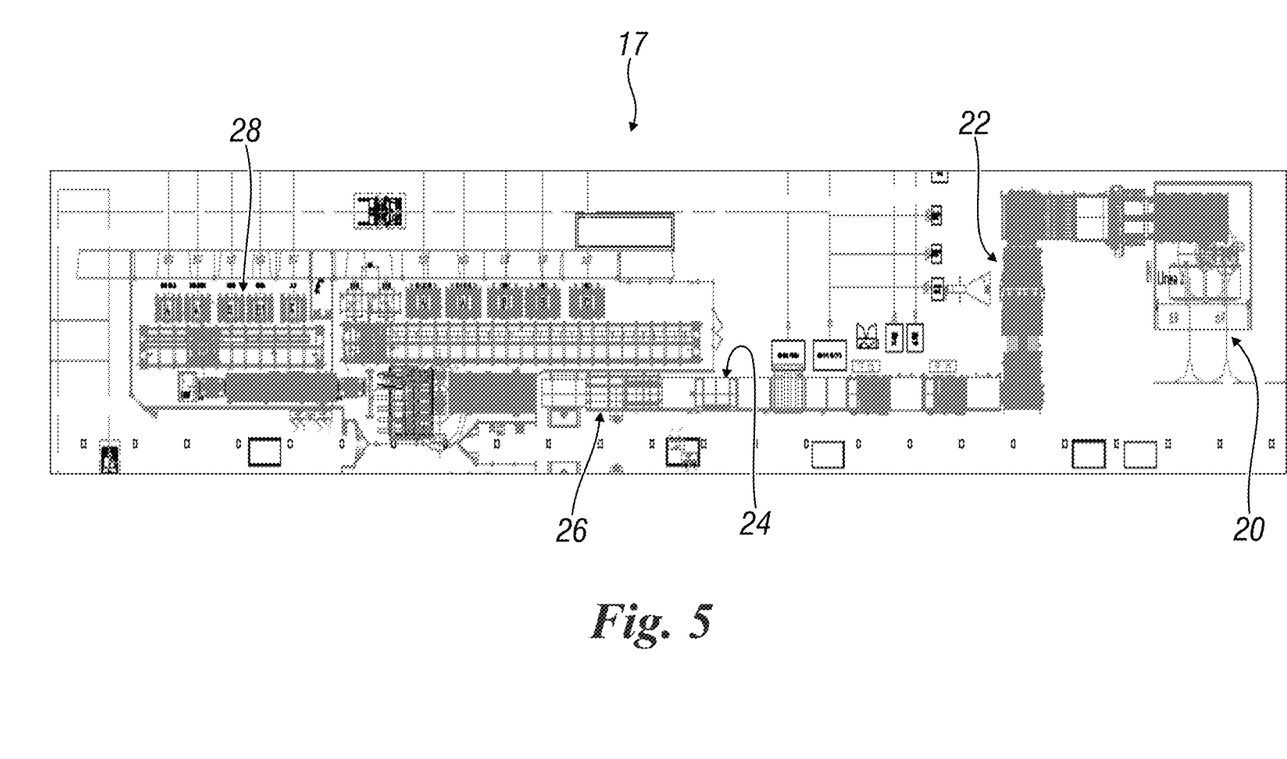
FIG. 5 schematically shows a top view of a detail of the third section of the plant according to the invention.

In the preferred embodiment illustrated in details in FIG. 5 said production lines 17 comprises each, and preferably with a linear and reciprocally sequential arrangement, a loading station 20 wherein the mother-slabs picked-up from the automatic store in the first macro-area 12 are loaded and transported thereto by using the automatic handling device, a cutting station 22 wherein the mother-slabs are split/cut into daughter-slabs having the requested formats, a brushing station 24 wherein the daughter-slabs coming from the cutting station 22 are cleaned out from any residues of the cutting operation, an inspection station 26 suitable for checking the dimensional and surface characteristics of the daughter-slabs by using an inspection device of an optical type or of another known type, an unloading station 28 wherein the daughter-slabs are unloaded into crates or pallets or are arranged on stands, as a function of the dimensions of the daughter-slabs themselves.

The mentioned production lines 17 are all identical for that which concerns the loading, cutting, and inspection stations and differ from each other for that which concerns the unloading station.

More specifically and with reference to the preferred embodiment according to the figures, two production lines (lines 1 and 4) will process those daughter-slab formats which are smaller and suitable for being put on trays to be put in turn into crates, further two lines (lines 3 and 5) are intended for handling bigger daughter-slab formats (for instance "300(mm)×150(mm)" or "150(mm)×150(mm)" slabs) which shall be put into crates without the presence of trays but include a layer pad between any two slabs or are to be arranged on stands, a further production line (line 2) is suitable for handling both daughter-slab formats intended for being put on trays and daughter-slab formats that don't require such trays (such unit does not handle those formats which are intended for being put on stands), and a cutting line (line 6) which is capable of handling any kinds of daughter-slab formats intended for being put on trays or directly into crates or arranged on stands.

The third macro-area 16 also comprises a sub-area 19 wherein the crates, before being closed and after placing the daughter-slabs (arranged on trays or not, depending on their formats) therein, are filled with foam or polyurethane foam materials used as elements for protecting the slabs during transportation and, also, wherein the crates and the daughter-slabs on stands undergo a wrapping operation by way of bands, tapes, and protective films, and wherein labels provided with an identification code are applied to said crates or stands (the automatic handling device reads such code, picks-up the crates or stands, and transfers them to the fourth macro-area 18).

Figure 6:
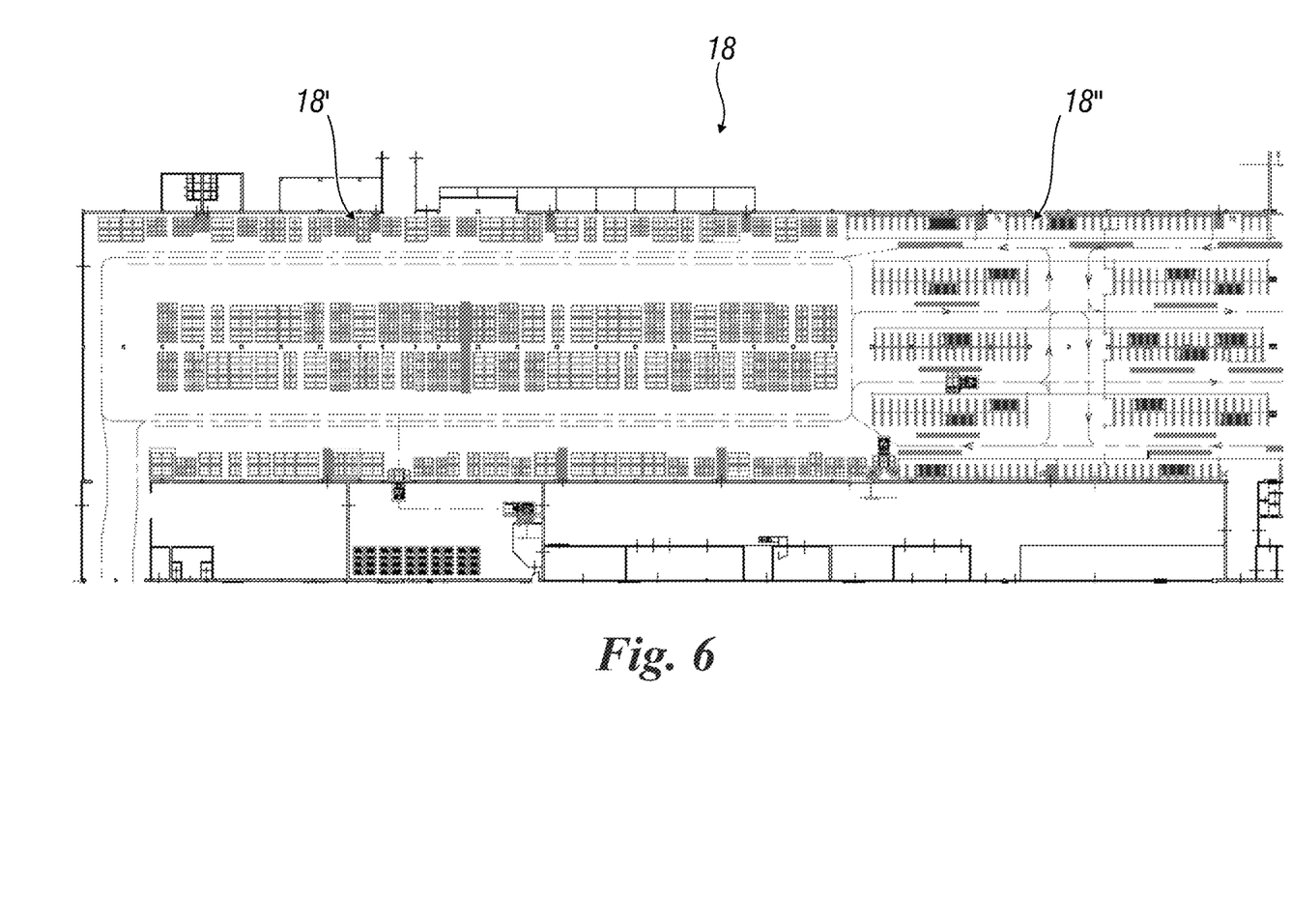
FIG. 6 schematically shows a top view of a fourth section of the plant according to the invention.

FIG. 6 shows in details the fourth macro-area 18 which comprises a finished products area or store through/in which the packed daughter-slabs coming from the third macro-area 16 pass or are buffered.

The store according to the fourth macro-area 18 comprises two sections, namely a first section 18' (also referred to as "block store" section) and a second section 18" (also referred to as "cantilever" section).

The first section 18' defines a finished product store which comprises finished products that make up a load, i.e. a set of packagings having the same identification code meant as a shipping code, irrespective of the shipment order, even if manufactured at different instants in time, where the crates or stands belonging to a uniform family (for instance one and the same order code) are stored.

The second section 18" defines a store suitable for temporarily storing (buffering) small orders or individual crates that are not suitable for being packed in the first section 18'.

The storage of the finished products in the store (either in the first or second section 18' or 18") and the picking-up of the finished products themselves for their subsequent shipping is performed by way of automatic handling devices.

Said fourth macro-area is controlled by the same central control unit that controls the complete production and operating process of the plant according to the invention.

Also, the plant according to the invention comprises sensors (of a known type) the function of which is to continuously monitor all steps of the production cycle and the operation of the automatic handling devices; this in order to perform a feedback control of the production cycle and to adjust it on the basis of the cycle timings bound to the requested order of products, changes of format, downtimes, or the like.

The operation of a plant according to the invention, as described above with reference to its component parts, is described below.

All macro-areas that make-up the plant are managed and controlled by way of a central unit the function of which is to program, control, manage, and optimize all steps of the production cycle on the basis of work orders.

The logic adopted for the operation and control of the plant according to the invention is based on a software which comprises a "smart" production scheduling algorithm, which starts from a receipt of an order from a customer which, after being loaded into the central unit is processed as a work order on the basis of a material output flow, i.e. on the basis of the daughter-slabs that shall be put in one and the same crate or arranged on trays to be put into crates or arranged on stands, according to finished product preparation and delivered modes (adjustment and management being made according to the data coming from the semi-finished product store in the first macro-area 12, the data relevant to the use of the processing unit in the third macro-area 16, the data coming from the finished product store in the fourth macro-areas, all of which allows to set the product delivery timings).

The central unit, by way of the scheduling logic as mentioned above, schedules, manages, and also optimizes the paths and the movement of the automatic handling devices within the macro-areas of the plant according to the entered order.

In addition, the data taken from the sensors of the plant is sent to the central unit, then to the above-mentioned software, in the light of a continuous functional feedback suitable for adjusting the production/processing steps and moving the automatic handling devices (as a function of the timings set forth by the order and/or in order to take account of any changes of format or downtimes).

Whenever a supply order is received for slabs (be it an order for a shipment to outside or an order for replenishing a store or for processing slabs in an external marble processing facility), the elements or parameters that characterize such order are entered/loaded into the management software of the plant; specifically, such characteristic elements possibly comprise slab format, color, surface finishing and/or material, number of slabs, any request for slabs having the same format but different colors and/or surface finishing, shipping and/or customer's collection, etc.; other parameters might also be considered, as appropriate for identifying an order for an external customer or for an internal supply to a store (for instance, in the case that raw-finished slabs are to be sent to a marble processing facility for polishing operations or similar surface processing).

Then order is processed by the central unit (i.e. by the software provided with the order processing algorithm) on the basis of such parameters, the availability of the material in the semi-finished product store in the first macro-area 12, the processings necessary to obtain the daughter-slabs, and the processing unit setting times or downtimes, if any, and a hypothetic scheduling is generated for completing and delivering the finished products, and a production cycle or order is set wherein the paths of the automatic handling devices between the different macro-areas of the plant according to the invention are planned and managed on the basis of the entered and above considered parameter.

The central unit, by way of the software equipped with the order processing algorithm, will schedule the sequence of execution of the orders on the basis of the availability, or not, of the semi-finished products in the store, boxes/crates and/or stands for putting the daughter-slabs derived from the mother-slabs therein, the delivery and collection times, a priority being given to the orders on the basis of the above-mentioned characteristic elements.

The same central unit, by way of said software, will determine the type of processing unit 17 to be used and will assign a higher priority to those orders which need processings in the production line which can be carried out without any changes of format or reset; this takes place, for instance, in the case of an order for small quantities (boxed or on-stand products) in order not to be obliged to have a downtime because of a change of format.

Once an order is scheduled by the central unit, its execution takes place as described in details below.

In the case of a work order for replenishment of the automatic semi-finished product store, the pallets with the mother-slabs to be inserted in the automatic store in the first macro-area 12 (i.e. those pallets which comprise the slabs coming from the baking furnaces and/or from the marble processing facility) are positioned in correspondence with fixed reference points, so as to allow for an automatic handling device to pick-up said mother-slabs (after reading the identification code associated therewith) and transfer them to the automatic store and arrange them on the shelves associated with the identification code associated with said mother-slabs.

Once the customer/supplier-order is entered in and processed by the central unit, a work order is generated, on the basis of which the movement of the automatic handling devices, the provisioning of crates, trays, or stands, etc. are managed.

A work order can be derived from a customer-order or from a supplier-order (for instance, in the case that raw semi-finished mother-slabs are to be sent to an external marble processing facility for undergoing polishing operations and the like) and, consequently, the movements and the paths of the automatic handling devices will be different.

In the case of a supplier-order intended for provisioning processed (i.e. polished or the like) mother-slabs, the automatic handling devices, upon receipt of a movement-enabling signal from the central unit, pick-up mother-slabs from the automatic store and, specifically, they pick-up them from those shelves whose identification code is associated with those of the slabs and put them on fixed reference points arranged outside the automatic store, from which they are picked-up manually or in another known manner and transferred for being submitted to polishing/smoothing operations or the like.

In the case of a customer-order, once a work order is generated, the central unit sets the missions of the automatic handling devices, said automatic handling devices picking-up the mother-slabs having the identification code specified in the order from the automatic store in the first macro-area 12 and transfer them to the third macro-area 16, where they are loaded onto the production line appointed thereto.

It is to be understood that a supplier-order and a customer-order can be processed simultaneously, the central unit setting the missions of the automatic handling devices and of the different apparatuses in the macro-areas.

At the same time, further automatic handling devices pick-up the trays and/or crates and/or stands from the further store in the second macro-area 14 and transfer them to the appointed production lines in the third macro-area 16; it is to be understood that, in this case too, the automatic handling devices read the identification code or the dimensions, or assesses the position of the trays/crates stands in order to pick-up that associated with the material according to the order.

The mother-slabs are processed in the production lines to obtain daughter-slabs which are arranged, depending on their formats, on trays that are subsequently put into crates, or are put directly into crates, or even are arranged on stands.

In this step, as described before, the mother-slabs are loaded in the appointed cutting lines for being processed (according to the work order), cut according to standard or non-standard formats to obtain daughter-slabs which are subsequently brushed, inspected, and finally unloaded onto trays or crates or stands.

At this point, the automatic handling devices transfer the crates and/or stands to the sub-area 19 in the third macro-area 16, where they undergo a "winding" operation (film wrapping, insertion of foam into crates, application of labels on the crates and/or stands).

The central unit manages the work order processing cycle in the third macro-area 16, by queueing said orders on the basis of the daughter-slab formats to be obtained from the mother-slabs (dimensions, color, surface finishing) even if they are orders belonging to different customers.

Also, the production cycle is optimized by feeding two or more containers to the appointed production lines simultaneously, so as to optimize the paths of the automatic handling devices.

The crates and/or stands provided with the daughter-slab, after passing through the sub-area 19, are transferred by the automatic handling devices to the fourth macro-area 18 and stored in the finish product store.

The finished products remain stored in the store of the fourth macro-area 18, from which they will subsequently be picked-up, also by the automatic handling devices, for being delivered and/or shipped.

As it can be inferred from the foregoing, apparent are the advantages that are achieved by a plant according to the invention, which implements the above-described process.

The plant according to the present invention as described above with reference to a preferred but not limitative embodiment thereof, makes it possible to manufacture slabs/tiles of different formats starting from smoothed/polished or raw mother-slabs in a fully automatic manner, the production/processing cycle management being characterized in comprising optimized production steps which advantageously allow to optimize the related production costs.

A further advantage consists in that the plant according to the invention does not comprise a finished product store in which quantities of finished products (i.e. tiles) are stored sorted according to the dimensional characteristics, type of material or color or surface finish or, even, subdivided according to the number of tiles comprising one package, but rather a finished product store the function of which is to define a short-term storage area for those finished products which define a customer-order; such configuration and management make it possible to cut the production costs and the storage costs which concur in defining the product costs.

A further advantage consists of the mode or logic used to manage the plant according to the invention, which allows to have an estimate of the delivery times of products and allows to optimize the steps of a production process as a result of processing of a plurality of parameters which define/generate a work order, said optimization of the steps of the production process comprising an optimized programming of the paths and of the handlings of the automatic handling devices which are moved between the different operating areas of the plant, an optimized preparation of crates and stands for accommodating the finished products, a management/occupancy of the processing units that define a production area wherein the slabs coming from the automatic store (mother-slabs) are processed to obtain daughter-slabs.

Further advantageous is the fact that the plant according to the invention, by means of which the process whereby slabs or tiles are manufactured starting from bigger-size slabs is implemented, makes it possible to process the work orders on a per job basis, which implies zeroing the costs bound to a finished product store for preparing an order, considering that the plant according to the invention and the process applied thereto make it possible to follow a just-in-time logic and don't require to create stocks of products ready for being sold.

Further advantageous is the fact that the plant according to the invention makes it possible to process orders of different types such as, for instance, a customer-order and a supplier-order simultaneously.

Even though the invention has been described above with a specific reference to one embodiment thereof provided for explanatory, non-limitative purposes only, numerous modifications and variants will be apparent to a person skilled in the art in the light of the above description.

Therefore, the present disclosure shall be construed to embrace any modifications and variants that fall within the scope of the following claims.

The invention claimed is:

1. A process for producing sub-formats of slabs starting from big-format mother-slabs comprising the following steps:

providing an automated plant (10) for cutting and operating flat slabs made from ceramic or the like for typically but not exclusively manufacturing tiles intended for use as coating elements at both civil and industrial levels and for both indoor and outdoor environments, the automated plant comprising:

a first macro-area (12) defining an area adapted for storing products consisting of mother-slabs, the first macro-area comprising an automated or robotized store wherein mother-slabs coming from ceramic furnaces and featuring a natural or polished surface finishing are stored, wherein said store comprises a plurality of shelves (12') comprising encoded storing positions, each of said storing positions being associated with a respective store position code, said plurality of shelves (12') adapted for receiving mother-slabs, wherein each of the mother-slabs includes a product code, and wherein each product code is associated with a respective store position code;

a second macro-area (14) defining an area adapted for storing auxiliary packing materials or consumable materials for operations or processes on said slabs, the second macro-area comprising a further store (14') adapted for storing packing means, said packing means comprising any of crates, boxes, racks, stands, or layer pads, for packing daughter-slabs obtained from the mother-slabs, wherein the second macro-area comprises different zones adapted for storing different packing means;

a third macro-area (16) defining a production area adapted for processing, packaging, and packing daughter-slabs or sub-formats of slabs obtained from mother-slabs coming from the first macro-area (12), the third macro-area comprising at least one production line (17) adapted for cutting, cleaning, checking, and unloading daughter-slabs obtained from the mother-slabs in boxes or on stands or crates, wherein the daughter-slabs have the same format, and wherein the third macro-area comprises a sub-area (19) comprising means for completing stands or crates provided with the daughter-slabs;

a fourth macro-area (18) defining an area that comprises a finished product store adapted for receiving products coming from the third macro-area (16) and letting the products coming from the third macro-area (16) pass through or temporarily accumulate;

automatic handling means for slaving and handling materials and semi-finished and finished products between said macro-areas and internally thereto; and a central control unit adapted for programming, managing, and controlling the operation of said macro-areas and the interaction therebetween;

entering a product order in the central control unit, said product order being based on a customer order;

on the basis of the product order, generating a work order by way of a management algorithm resident in the central control unit on the basis of slab parameters, the slab parameters including the format of the daughter-slab to be obtained from mother-slabs, material, color, surface finishing, and number of daughter-slabs making-up an order;

wherein the work order is processed on the basis of a material output flow, including being processed on the basis of the daughter-slabs that shall be put in one and the same crate or on the basis of daughter-slabs to be arranged on trays to be put in crates or arranged on a stand, on the basis of the finished product preparation and delivery modes by way of an adjustment and management based on data coming from the semi-finished product store in the first macro-area (12), data relevant to the use of the processing units in the third macro-area (16), and data coming from the finished product store in the fourth macro-area (18);

generating an order completion timing diagram;

defining and optimizing missions or paths for the automatic handling devices internally to the plant for slaving the macro-areas (12, 14, 16, 18) on the basis of the work order;

wherein the customer-order comprises the following steps:

generating a work order;

defining missions/paths for the automatic handling devices,     picking-up at least one mother-slab from the automatic store in the first macro-area (12), the identification code of said at least one slab having previously been read by the automatic handling device, said identification code being associated with a code of the work order and said picking-up step being one wherein the picked-up mother-slabs can have different formats and/or different colors and finishings and/or different material from each other;

transferring said at least one mother-slab to the third macro-area (16) and loading it in the production line (17) in said third macro-area;

processing said at least one mother-slab in said production lines (17), said mother-slabs being fed to the production lines (17) as a function of the daughter-slab formats that are to be obtained from the mother-slab irrespective of the customer that the order is associated with;

picking-up trays and/or crates and/or stands from a further store in the second macro-area (14), said picking-up being performed by way of further automatic handling devices, said trays and/or crates and/or stands being transferred to the at least one production line (17) in the third macro-area (16), said picking-up step of the further store in the second macro-area (14) being performed by reading of an identification code or the dimensions or the specific position, in the store (14), of trays and/or crates and/or stands associated with the code of the mother-slabs being processed in the production lines (17);

laying the daughter-slab down on trays suitable for being put in crates or putting the daughter-slabs in crates or laying them down on stands, said step being a function of the daughter-slab format;

transferring said crates and/or stands to a sub-area (19) in the third macro-area (16) by using automatic handling devices, the crates being filled in said sub-area (19) with protective materials before being closed, said crates being closed and the stands being subjected to a film wrapping operation and an application of identification labels;

making the automatic handling devices transfer said crates and stands to the fourth macro-area (18), after reading the identification codes of said crates and stands; and     temporarily storing (buffering) said crates and/or stands in a store in the fourth macro-area (18), said crates and/or stands being stored in the first section (18') of the store if belonging to one and the same customer-order and/or belonging to a stock order aiming at storing products intended for the store, and being stored in the second section (18") if belonging to small orders or if consisting of individual crates not suitable for being stacked in the first section 18'; and wherein customer-orders of different types and supply orders are simultaneously preset internally to one and the same production cycle and in accordance with one and the same order, regardless of whether the slab parameters are the same or different parameters.

2. The process according to claim 1, characterized in that the different zones adapted for storing different packing means are provided with different identifications codes associated with respective identification codes of daughter-slabs and said further store comprises zones for storing consumable materials for the mother-slab processing operations.

3. The process according to claim 1, characterized in that the means for completing stands or crates of the sub-area (19) comprises a filling station for filling the crates with shock absorbing materials, a wrapping station, and a labelling station for labelling said crates or stands.

4. The process according to claim 1, characterized in that the finished product store in the fourth macro-area (18) comprises a first section (18') defining a finished product store receiving finished products that make up a load of packages featuring one and the same identification code meant as a shipping code, and irrespective of the shipping order, even though manufactured at different instants in time, and a second section (18") which defines a store for temporarily storing (buffering) small orders or individual crates not suitable for being packed in the first section (18').

5. The process according to claim 1, characterized in that the automatic handling devices comprise laser guide vehicles (LGVs) or vehicles having other type of guide, controlled by means of the central control unit.

6. The process according to claim 1, characterized in that it comprises sensors for a continuous monitoring of the steps of the production cycle for a feedback control of said cycle and its adjustment as a function of the cycle timings bound to the requested priorities of the products, changes of format, or downtimes, if any.

7. The process according to claim 1, characterized in that processing the supply-order comprises the following steps:

generating a work order on the basis of said supply-order;

making the central unit enable the movement of the automatic handling devices, said handing devices being moved to the first macro-area (12);

picking-up one or several mother-slabs from a position in the automatic store in said first macro-area (12), said step being performed by way of an identification code of the mother-slab being read by the automatic device, said identification code being associated with a corresponding code of the work order;

transferring said one or several mother-slabs and putting them in fixed reference points of a pick-up area external to the automatic store in the first macro-area (12);

manually picking-up said at least one mother-slab and transferring it to plants suitable for performing smoothing/finishing processings, said step being performed by reading the identification code of the mother-slabs in the point of arrival in the smoothing/finishing plant.

\* \* \* \* \*